UNITED STATES PATENT OFFICE.

JOHN ADOLPH WENDEL, OF MILWAUKEE, WISCONSIN.

MINERAL FERTILIZER.

No. 892,342.　　　　Specification of Letters Patent.　　Patented June 30, 1908.

Application filed October 2, 1907. Serial No. 395,561.

*To all whom it may concern:*

Be it known that I, JOHN ADOLPH WENDEL, a citizen of the United States, residing at Milwaukee, in the county of Milwaukee and State of Wisconsin, have invented new and useful Improvements in Mineral Fertilizers, of which the following is a specification.

This invention is an improved mineral fertilizer, as hereinafter described.

My improved mineral fertilizer consists of:—

| Ingredient | Parts |
|---|---|
| Primary rock, (porphyry, granite, or gneiss) | 100 parts |
| Dolomite | 10 " |
| Phosphorite | 10 " |
| Sodium sulfate exsiccated | 5 " |
| Calcium sulfate | 10 " |
| Ferrous sulfate | 5 " |
| Magnesium sulfate | 5 " |
| Calcium carbonate | 10 to 20 " |
| Silicic acid or silicious earth | 25 to 50 " |
| Kainit | 5 to 10 " |

In preparing my improved fertilizer, the rocks are burned in an oven, after which they are at once cooled off in cold water and finally crushed in a mill. The other ingredients which have also been previously comminuted are now added to the burned and powdered rock and intimately mixed therewith. The fertilizer is then placed in bags or other suitable receptacles and may be stored indefinitely in a dry place until it is to be used.

In practice, from 500 to 600 pounds of my improved fertilizer are required per acre. The fertilizer should be spread upon the land in autumn and well plowed into the soil.

My improved fertilizer is suitable for every description of soil, plant and fruit but produces the best results when used on land which is used for different crops in rotation, as for instance, barley, first year, rye, second year, oats third year, potatoes fourth year and turnips fifth year. The ingredients may be varied in proportion within the scope of my invention.

My improved fertilizer is not only valuable for use as such but is also valuable in protecting crops from injury by worms and insects.

Having thus described my invention, what I claim, is:—

1. The herein described fertilizer consisting of burned and comminuted primary rock, dolomite, phosphorite, sodium sulfate exsiccated, calcium sulfate, ferrous sulfate, magnesium sulfate, calcium carbonate, silicic acid or silicious earth, and kainit.

2. The herein described fertilizer consisting of burned and comminuted primary rock, dolomite, phosphorite, sodium sulfate exsiccated, calcium sulfate, ferrous sulfate, magnesium sulfate, calcium carbonate, silicic acid or silicious earth, and kainit, substantially in the proportions specified.

In testimony whereof I affix my signature in presence of two witnesses.

JOHN ADOLPH WENDEL.

Witnesses:
　LOUIS BLUM,
　ROSA WOLLER.